United States Patent [19]
Miyake

[11] Patent Number: 6,138,941
[45] Date of Patent: Oct. 31, 2000

[54] FLANGE FOR HOLLOW ARTICLE

[75] Inventor: Yoshiaki Miyake, Minami-Ashigara, Japan

[73] Assignee: Fuji Photo Film Co., Ltd., Kanagawa, Japan

[21] Appl. No.: 09/236,592

[22] Filed: Jan. 26, 1999

[30] Foreign Application Priority Data

| Jan. 28, 1998 | [JP] | Japan | 10-015239 |
| Mar. 17, 1998 | [JP] | Japan | 10-066694 |

[51] Int. Cl.⁷ ................................................. B65H 75/08
[52] U.S. Cl. ................... 242/613.5; 206/397; 242/613.4; 242/614.1; 396/415; 396/511
[58] Field of Search ................. 248/544, 309.1, 248/309.2, 682, 684, 205.1, 216.1, 216.4, 230.3, 231.41, 288.51, 298.1, 316.4, 329; 242/613.5, 613.4, 614.1, 608.5, 571.4; 396/406, 415, 511; 430/501; 206/397, 455

[56] References Cited

U.S. PATENT DOCUMENTS

| 4,002,310 | 1/1977 | Ganser et al. | 242/71.8 |
| 4,372,500 | 2/1983 | Saraisky | 242/55 |
| 4,455,076 | 6/1984 | Birkeland | 354/275 |
| 4,958,170 | 9/1990 | Schwartz et al. | 346/136 |
| 5,174,096 | 12/1992 | Fukuda | 53/551 |
| 5,267,704 | 12/1993 | Kitamura et al. | 242/72 R |
| 5,323,211 | 6/1994 | Fujii et al. | 248/562 X |
| 5,332,169 | 7/1994 | Harris et al. | 242/611 |
| 5,356,093 | 10/1994 | Kewin | 242/610.4 |
| 5,657,944 | 8/1997 | Kewin | 242/559.2 |
| 5,669,578 | 9/1997 | Ma | 242/613.5 |
| 5,791,588 | 8/1998 | Lindstrand | 242/608 |
| 5,799,898 | 9/1998 | Sumida et al. | 248/530.1 |
| 5,857,643 | 1/1999 | Czuprynski et al. | 242/613 |
| 5,897,083 | 4/1999 | Johnson | 248/75 |
| 5,908,172 | 6/1999 | Pierro et al. | 242/609.1 |
| 5,938,141 | 8/1999 | Kanba | 242/423.1 |
| 5,944,186 | 8/1999 | Sakai et al. | 206/397 |
| 5,961,063 | 10/1999 | Parry | 242/422.4 |
| 5,984,535 | 11/1999 | Fukuda et al. | 396/411 |
| 6,004,733 | 12/1999 | Ishii et al. | 430/501 |
| 6,059,238 | 5/2000 | Reynolds et al. | 248/118 |

FOREIGN PATENT DOCUMENTS 0 536 608 A1   4/1993   Germany.

*Primary Examiner*—Ramon O. Ramirez
*Assistant Examiner*—Tan Le
*Attorney, Agent, or Firm*—Sughrue, Mion, Zinn, Macpeak & Seas, PLLC

[57] ABSTRACT

The invention relates to a flange for a hollow article which can be easily separated from an end of the hollow article such as a paper tube, after a roll of photosensitive material or the like is used up. A flange 20, detachably attached to an end of a hollow article 21, comprises a disk 1 having a concentric hole 2 in a center thereof, a hollow cylindrical inserting member 3 extending from hole 2 along a center axis thereof, and two flexible segments 6 extending from hollow cylindrical inserting member 3 in a cantilevered manner, and symmetrically with respect to the center axis and along the center axis, and including a mechanism 8 or 10 provided between two flexible segments 6 for spacing the foremost ends of two flexible segments 6 away from each other or bringing them back to original positions thereof. External protuberances 12 on the foremost ends of flexible segments 6 are engaged with an inner surface of the end of hollow article 21 while the foremost end of flexible segments 6 are spaced away from each other to attach flange 20 to the end of hollow article 21, and flange 20 is detachable from the end of hollow article 21 while the foremost ends of flexible segments 6 are brought back to the original positions.

20 Claims, 16 Drawing Sheets

FLANGE FOR HOLLOW ARTICLE

BACKGROUND OF THE INVENTION

The present invention relates generally to a flange for hollow articles, and more specifically to a flange attached to both ends of a hollow article such as a core paper tube rod around which a long length of photographic paper or photosensitive film is wound.

For packaging and transportation of long lengths of photosensitive materials such as photographic paper, and photosensitive film, and attachment of them to machines, they are usually wound around a hollow core rod. For protection of the roll of photosensitive material, shielding it from light and ease of its handling, a disk-like flange is attached to a hollow paper tube with the photosensitive material wound around it.

Some methods for attaching such flanges to hollow core rods have so far been proposed in JU-A 1-38582, JU-B 1-38582, JP-A 9-211800, etc. JU-A 1-38582 discloses to couple a flange to a hollow core rod by use of a bonding agent. JU-B 6-31465 discloses a flange having an inserting member at its center, which is to be inserted through a hollow in a core rod. The inserting member is provided therearound with projections which are to be in engagement with the flange. JP-A 9-211800 discloses that a threaded shaft is axially inserted through a hollow in a core rod for connection and fixation to flanges at both ends thereof.

Such flanges are usually formed of plastics. Once a roll of photosensitive material has been used up, a paper tube with flanges attached thereto is discarded. However, the plastic flanges must be discarded while they are separated from the paper tube.

The flanges disclosed in JU-A 1-38582 are bonded to the paper tube, and it is not easy to separate the flanges from the paper tube. In the flanges disclosed in JU-B 6-31465, too, it is not easy to separate them from the paper tube because the projections are engaged in the paper tube. A special tool is needed for removal of the threaded shaft disclosed in JP-A 9-211800 from the paper tube.

Thus, the prime purpose of the prior art methods is to ensure the coupling of flanges to paper tubes, etc. In other words, ease of flange removal and the ability of flanges to be discarded are a matter of no interest, and so users suffer inconvenience.

SUMMARY OF THE INVENTION

In view of such problems with the prior art as mentioned above, it is an object of the invention to provide a flange for hollow articles, which can be easily separated from an end of a hollow article such as a paper tube after a roll of photosensitive material is used up.

According to a first aspect of the invention, the above object is achieved by the provision of a flange for a hollow article detachably attached to an end of a pipe-like hollow article, characterized by comprising a disk having a concentric hole in a center thereof, a hollow cylindrical inserting member extending directly from said hole in said disk or extending from said hole in said disk along a center axis thereof, and two flexible segments extending from said hollow cylindrical inserting member in a cantilevered manner, and symmetrically with respect to said center axis and along said center axis, and including a mechanism provided between said two flexible segments for spacing foremost ends of said two flexible segments away from each other or bringing them back to original positions thereof, wherein external protuberances on the foremost ends of said flexible segments are engaged with an inner surface of the end of said hollow article while the foremost ends of said flexible segments are spaced away from each other to attach said flange for a hollow article to the end of said hollow article, and said flange for a hollow article is detachable from the end of said hollow article while the foremost ends of said flexible segments are brought back to said original positions.

Preferably, the flange for a hollow article according to the invention further comprises an inwardly foldable strut joined to the foremost end of each of said flexible segments, said strut inwardly foldable along a folding line, being somewhat longer than a radius of said hole in said disk or said hollow cylindrical inserting member, and having a protuberant piece at a foremost end thereof, wherein said protuberant pieces are positioned such that when said strut segments are folded inwardly beyond a change point to bring said protuberant pieces in abutment on each other, thereby making folding of said strut segments stable and spacing said flexible segments away from each other.

Preferably, said flexible segments extend from said hollow cylindrical inserting member in a cantilevered manner, and symmetrically with respect to said center axis and along said center axis, and said hollow cylindrical inserting member is provided therearound with a spiral external thread.

Preferably, said hollow inserting member has a diameter decreasing in an insertion direction thereof, and said spiral external thread has a height increasing in said insertion direction.

Preferably, such a flange for a hollow article is all integrally molded of plastics.

Such a flange for a hollow article may be detachably attached to an end of a core paper tube of a roll of photosensitive material, around which a long length of photosensitive material is wound or an end of a metal pipe.

According to a second aspect of the invention, there is provided a flange for a hollow article detachably attached to an end of a pipe-like hollow article, comprising a disk having a concentric hole in a center thereof and a hollow cylindrical inserting member extending from said hole along a center axis thereof, characterized by comprising at least one cutout provided in a foremost end of said cylindrical inserting member by cutting out a foremost edge thereof in a concave form, wherein said cutout is provided therein with a rocking or sliding segment that is engaged with a side edge of said cutout to enlarge a length of circumference of the foremost end of said cylindrical inserting member or bring said length of circumference back to an original length thereof, so that while the length of circumference of the foremost end of said cylindrical inserting member is enlarged, said flange for a hollow article is attached to the end of said hollow article, and while the length of circumference of the foremost end of said cylindrical inserting member is brought back to the original length, said flange for a hollow article is detached from the end of said hollow article.

Preferably, two such cutouts are provided with the center axis of said hollow inserting member located therebetween.

Preferably, two symmetrical rocking segments having a symmetrical outside shape are provided symmetrically within opposite side edges of said cutout, one rocking segment being coupled to one side edge at one coupling point, another rocking segment being coupled to another side edge at another coupling point, and said rocking segments being coupled to each other at one coupling point, so that both said rocking segments can be turned between two positions and back and forth along said center axis with a change point located therebetween, thereby enlarging the length of circumference of the foremost end of said cylindrical inserting member or bringing said length of circumference to said original length of circumference.

Preferably, one rocking segment is provided in said cutout while it is coupled to one side edge of said cutout at one coupling point, so that said rocking segment can be swung between two positions and back and forth along a cylindrical wall of said cylindrical inserting member, thereby enlarging the length of circumference of the foremost end of said cylindrical inserting member or bringing said length of circumference back to said original length of circumference.

Preferably, one sliding segment is provided in said cutout while it is coupled to one side edge of said cutout at one coupling point, so that said rocking segment can be slid between two positions and back and forth along a cylindrical wall of said cylindrical inserting member, thereby enlarging the length of circumference of the foremost end of said cylindrical inserting member by wedge action or bringing said length of circumference back to said original length of circumference.

Preferably, a ring-like member is provided on the inside of a foremost end of said cylindrical inserting member, and between the foremost end of said cylindrical inserting member and said ring-like member there is provided a slit which extends from said cutout to a certain point in a circumferential direction.

According to a third aspect of the invention, there is provided a flange for a hollow article detachably attached to an end of a pipe-like hollow article, characterized by comprising a disk having a concentric hole in a center thereof and a hollow cylindrical inserting member extending from said hole along a center axis thereof, wherein said hollow cylindrical inserting member comprises a cylindrical root contiguous to said disk and two semi-cylindrical expandable portions, each joined to said cylindrical root through three strut members, and expandable outwardly with respect to each other against resiliency with said center axis located therebetween, and between two positions between foremost ends of said semi-cylindrical expandable portions and with said center axis located therebetween, there are provided rocking or sliding segments that are engaged with side edges of the foremost ends of said semi-cylindrical expandable portions to space said semi-cylindrical expandable portions away from each other or to bring them back to original positions thereof, so that while said semi-cylindrical expandable portions are spaced away from each other, said flange for a hollow article is attached to the end of said hollow article, and while said semi-cylindrical expandable portions are brought back to said original positions, said flange for a hollow article is detached from the end of said hollow article.

Preferably, a center strut member located between said cylindrical root and one said semi-cylindrical expandable portions bears action of flexing said semi-cylindrical expandable portion resiliently with respect to said cylindrical root, and both side strut members located between said cylindrical rood and one said semi-cylindrical expandable portion bear action of preventing said semi-cylindrical expandable portions having said rocking or sliding segments from being displaced with respect to each other.

Preferably, a spacing between said side strut member joined to one of said semi-cylindrical expandable portions and said side strut joined to the other of said semi-cylindrical expandable portions becomes wide toward said disk.

Preferably, ring-like members are provided on the inside of the foremost ends of said semi-cylindrical expandable portions, and between said semi-cylindrical expandable portions and said ring-like members there are provided slits, each extending from a side edge of said semi-cylindrical expandable portion to a certain point in a circumferential direction.

Preferably, such a flange for a hollow article is all integrally molded of plastics.

Such a flange for a hollow article may be detachably attached to an end of a core paper tube of a roll of photosensitive material, around which a long length of photosensitive material is wound or an end of a metal pipe.

The flange for hollow articles according to the first aspect of the invention includes a mechanism provided between the two flexible segments for spacing the foremost ends of the two flexible segments away from each other or bringing them back to the original positions thereof, wherein external protuberances on the foremost ends of the flexible segments are engaged with the inner surface of the end of the hollow article while the flexible segments are spaced away from each other to attach the flange for a hollow article to the end of the hollow article, and the flange for a hollow article is detachable from the end of the hollow article while the flexible segments are brought back to the original positions. Thus, the flange can be separated from the hollow article in simple one-touch operation; after a roll of photosensitive material or the like is used up, the flange can be discarded apart from the hollow article such as a paper tube to the end of which the flange is attached, and which is formed of material different from that of the flange.

In the flange for a hollow article according to the second or third aspect of the invention, at least one cutout provided in the foremost end of the cylindrical inserting member by cutting out a foremost edge thereof in a concave form is provided therein with a rocking or sliding segment that is engaged with a side edge of the cutout to enlarge a length of circumference of the foremost end of the cylindrical inserting member or bring the length of circumference back to the original length thereof, so that while the length of circumference of the foremost end of the cylindrical inserting member is enlarged, the flange for a hollow article is attached to the end of the hollow article, and while the length of circumference of the foremost end of the cylindrical inserting member is brought back to the original length, the flange for a hollow article is detached from the end of the hollow article. Thus, the flange can be attached to, and separated from, the hollow article in simple one-touch operation; after a roll of photosensitive material or the like is used up, the flange can be discarded apart from the hollow article such as a paper tube to the end of which the flange is attached, and which is formed of material different from that of the flange. In addition, the mechanism for increasing the diameter of the foremost end of the cylindrical inserting member or bringing it back to the original diameter does not project into the cylindrical space of the flange, so that the cylindrical space can be used for accommodating a driving mechanism for driving a roll of photosensitive material Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Preferred embodiments of the flange for hollow articles according to the invention are now explained with reference to the accompanying drawings. FIGS. 1 to 9 illustrate the flange for hollow articles according to the first aspect of the invention, and FIGS. 10 to 17 the flanges for hollow articles according to the second, and third aspects of the invention.

Figure 1:
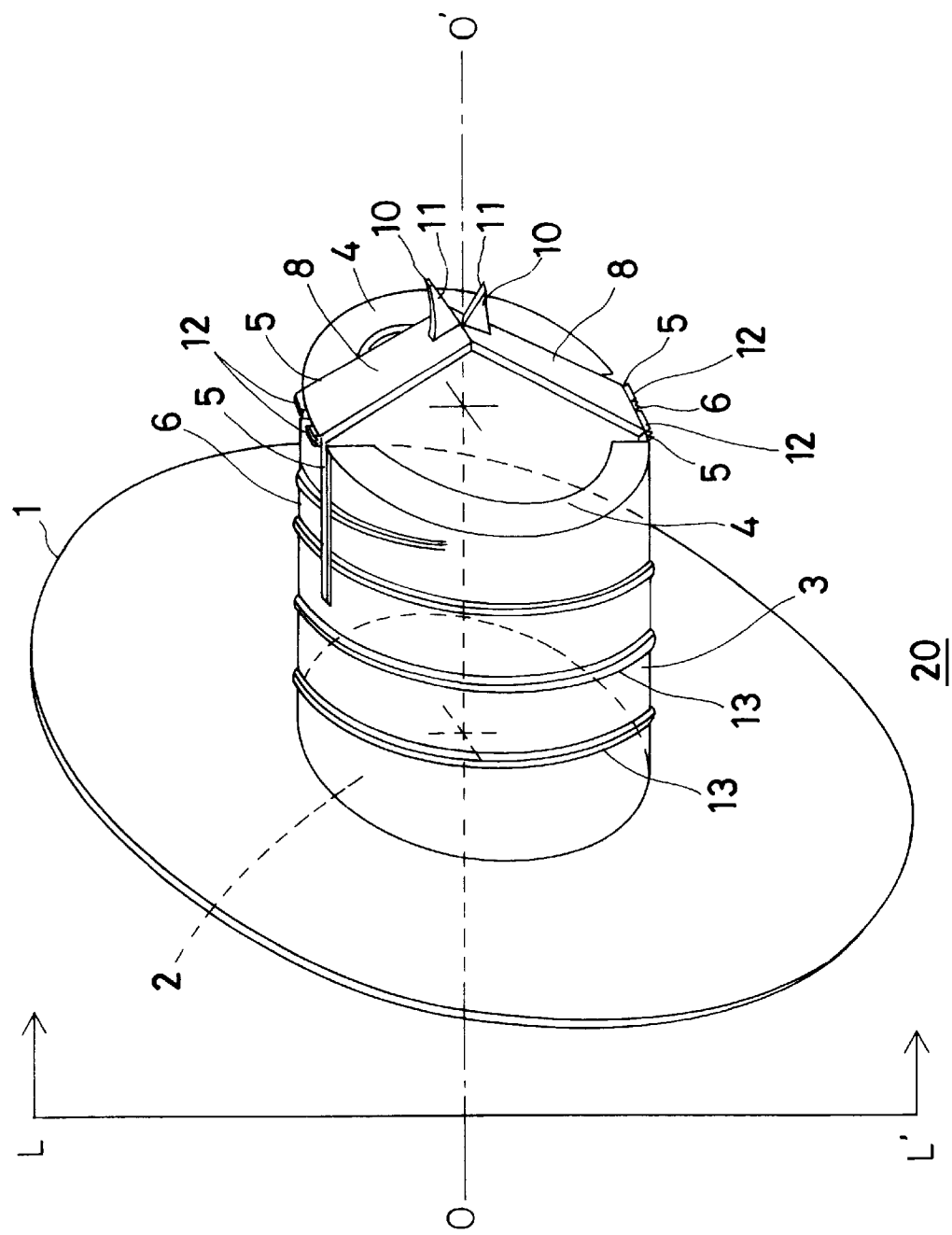
FIG. 1 is a perspective view of one embodiment of the flange for a hollow article according to the invention.
Figure 2:
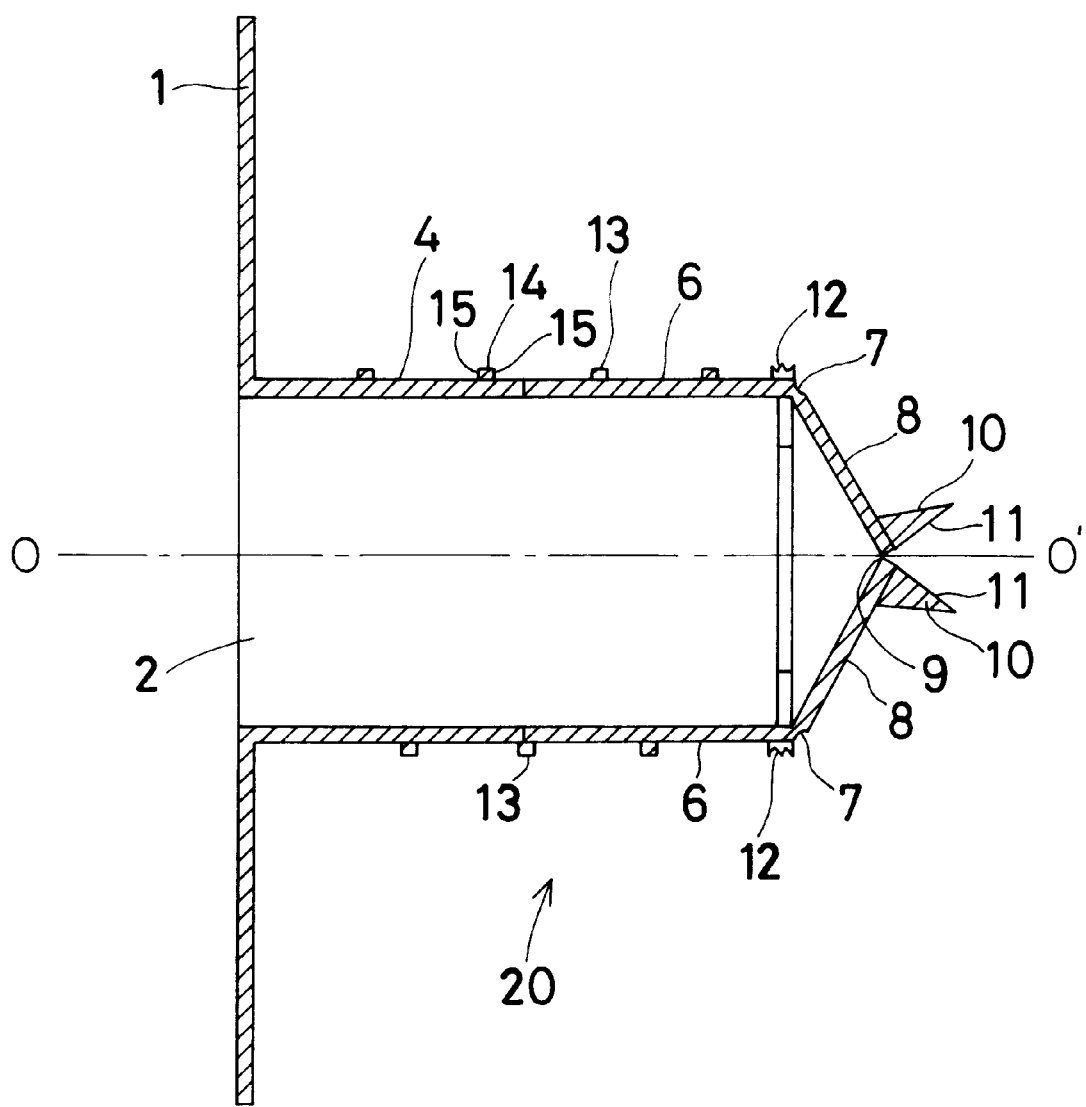
FIG. 2 is a sectional view of the flange for a hollow article in FIG. 1.

FIG. 1 is a perspective view of one embodiment of a flange 20 for hollow articles according to the invention, and FIG. 2 is a sectional view taken along a center axis O–O' of FIG. 1 and a straight line L–L' of FIG. 1 intersecting at right angles therewith. This flange 20 for hollow articles is all integrally molded of a plastic material, and comprises a disk (flange) 1 having a concentric hole 2 in its center and a cylindrical inserting member 3 which extends from the hole 2 in the disk 1 by a certain length along the center axis O–O'. To increase the rigidity of the cylindrical inserting member 3, a ring-like member 4 extends from a foremost end of the cylindrical inserting member 3 along the center axis O–O' to a portion other than flexible segments 6 to be explained later. Four slits 5, each of which is shorter than the length of the inserting member 3 and has the same length, are provided along the center axis O–O' from the foremost end of the cylindrical inserting member 3 and symmetrically with respect to the center axis O–O'. Of these slits 5, one pair of slits 5 are so close to each other that two flexible segments 6 can be located between them. The same holds for another pair of slits 5.

These two flexible segments 6 are positioned symmetrically with respect to the center axis O–O', and extend from the inserting member 3 along the center axis O–O' in a cantilevered manner, so that upon outward or inward force applied on the foremost ends thereof, they can flex outwardly or inwardly. Each flexible segment 6 is connected at a folding line 7 at its foremost end to a strut 8. The foremost ends of struts 8 are joined to each other at a folding line 9 on the center axis O–O'. The length of each strut 8 is somewhat longer than the radius of the cylindrical inserting member 3. It is here to be noted that the foremost ends of the struts 8 may not be joined to each other at the folding line 9 or may be separated from each other at the folding line 9 after molding or during use.

Figure 18A:
FIGS. 18(a)–(h) are sectional views of the protuberance and external thread usable for the flange for a hollow article according to the invention.
Figure 18B:
Figure 18C:
Figure 18D:
Figure 18E:
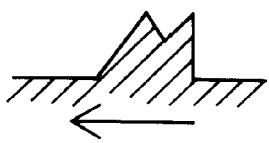
Figure 18F:
Figure 18G:
Figure 18H:

In the vicinity of the folding line 7 at the foremost end of each flexible segment 6 there is provided a protuberance 12 extending radially and outwardly from the center line O–O'. A section of the protuberance 12 along the center axis O–O' has such a shape as shown in FIG. 18(b). A foremost end of each strut 8 that is in contact with the folding line 9 is provided with a protuberant piece 10 that faces away from the disk 1. The protuberant pieces 10 oppose to each other at faces 11.

An outer circumference of the cylindrical inserting member 3 including the flexible segments 6 is provided with a spiral external thread 13 at a large pitch. A section of the external thread 13 along the center axis O–O' has a rectangular shape comprising an upper surface 14 parallel with the center axis O–O' and side surfaces 15 vertical to the center axis O–O', as shown in FIG. 2.

Figure 3:
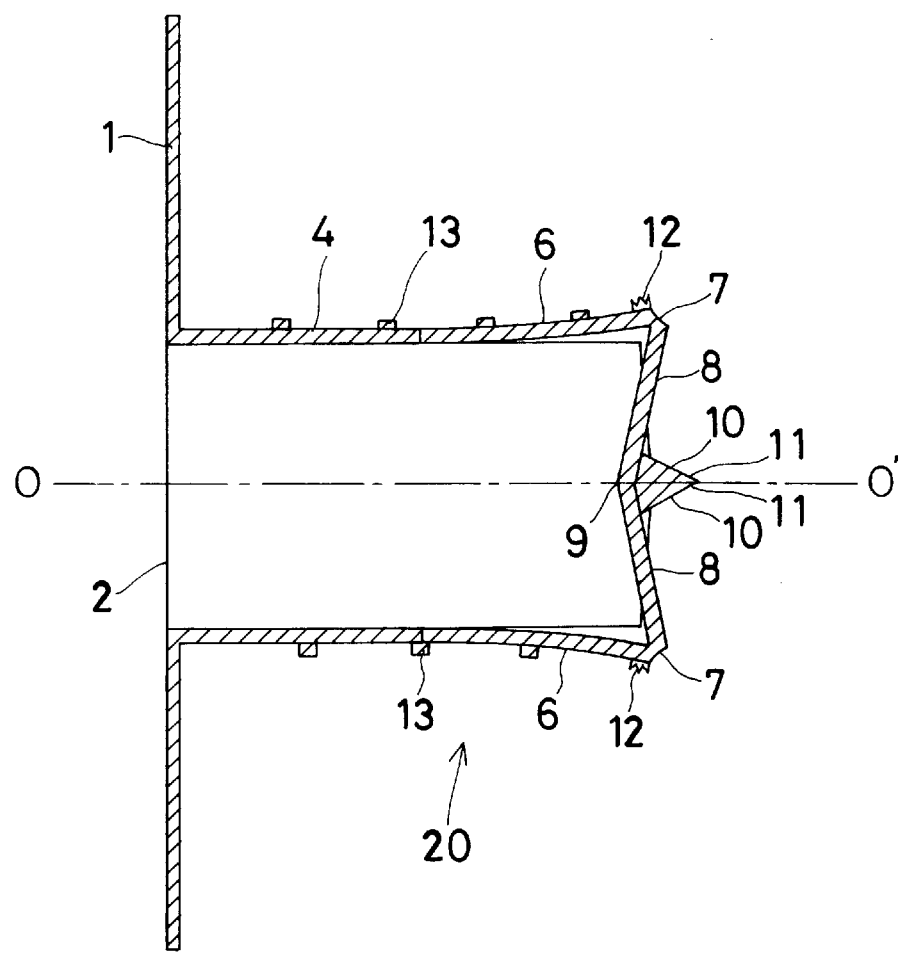
FIG. 3 is a sectional view of the embodiment in which struts are forged.

FIG. 3 illustrates the state of the struts 8 joined to the foremost ends of the associated flexible segments 6 and joined to each other at their foremost ends, which are forced in the cylindrical inserting member 3 beyond a change point. In the illustrated state, the protuberant pieces 10 provided at the foremost ends of the struts 8 abut each other at the opposite faces 11, so that the struts 8 can be kept from tilting beyond the angle illustrated in FIG. 3 in the cylindrical inserting member 3. Then, the length of the struts 8 is somewhat longer than the radius of the cylindrical inserting member 3, and the angle of the faces 11 of the protuberant pieces 10 with respect to the struts 8 is preset such that the flexible segments 6 joined to the roots of the struts 8 flex outwardly.

Immediately after molding, the flange 20 for hollow articles according to this embodiment has such an arrangement as shown in FIGS. 1 and 2. In this arrangement, the struts 8 joined to the foremost ends of the flexible segments 6 and joined to each other at the folding line 9 bend outwardly from the cylindrical inserting member 3 at the folding line 7. In this position, the flexible segments 6 are in an as-molded state or do not flex either outwardly or inwardly. When, in this state, the protuberant pieces 10 on the struts 8 are pushed toward the disk 1 along the center axis O–O', the struts 8 go beyond the change point and are held in the state shown in FIG. 3 . Then, the flexible segments 6 flex outwardly in an expanded state, so that the protuberances 12 at the foremost ends of the flexible segments 6, too, can be expanded in a radial direction.

Figure 4:
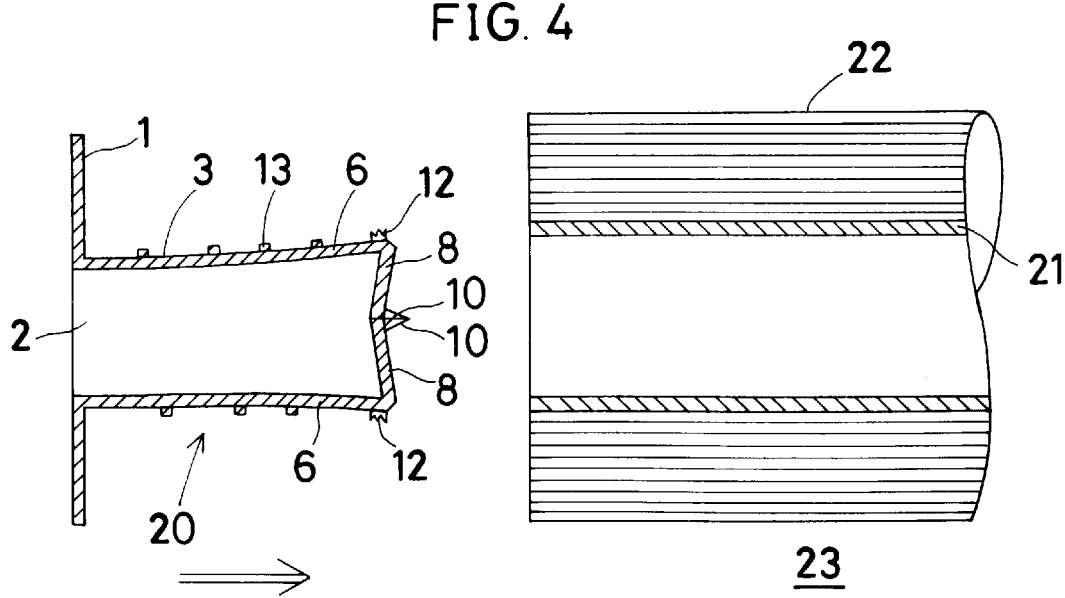
FIG. 4 is a sectional view of the flange for a hollow article shown in FIG. 1, before attached to an end of a roll of photosensitive material.

To attach the above flange 20 for hollow articles to a hollow paper tube 21 of a roll of photosensitive material 23 serving as a core rod around which a long length of photosensitive material 22 such as photographic paper or photosensitive film is wound as shown in FIG. 4, the flange 20 is inserted in the paper tube in a direction shown by an arrow in FIG. 4, while the flexible segments 6 in FIG. 3 are expanded. Since the flexible segments 6 are expanded in this state, however, it is impossible to insert the flange 20 in the paper tube 21 only by pushing it in the arrow direction. For this reason, the flange 20 is turned clockwise to screw it in the paper tube 21 of the roll of the photosensitive material 23, using the spiral external thread 13 .

Figure 5:
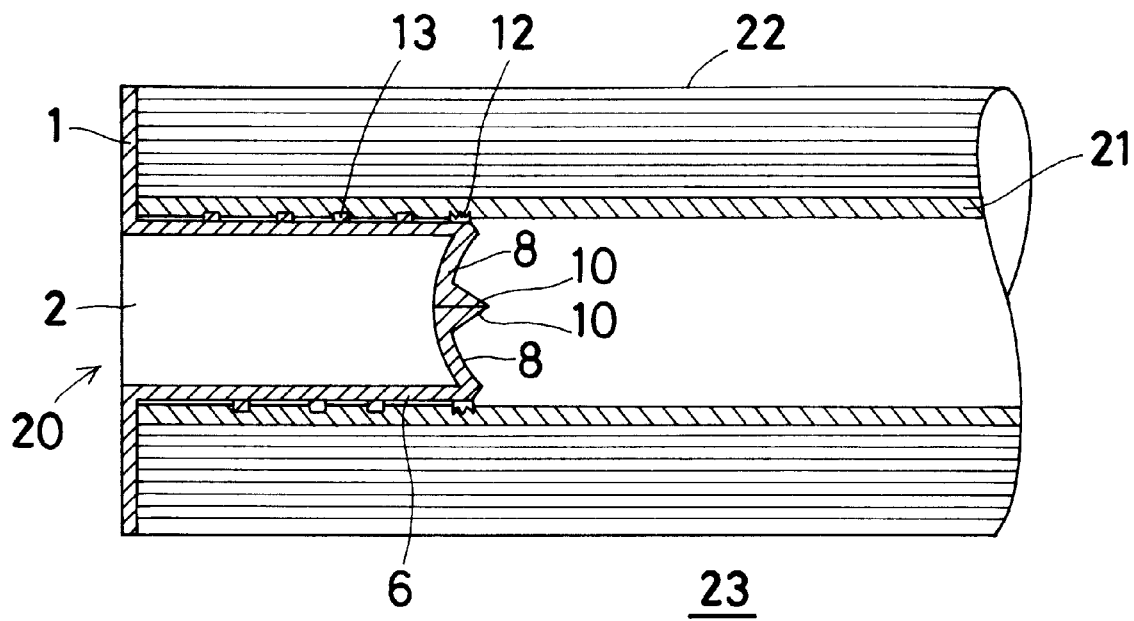
FIG. 5. is a sectional view of the flange for a hollow article shown in FIG. 1, which is attached to the end of a roll of photosensitive material.
Figure 6A:
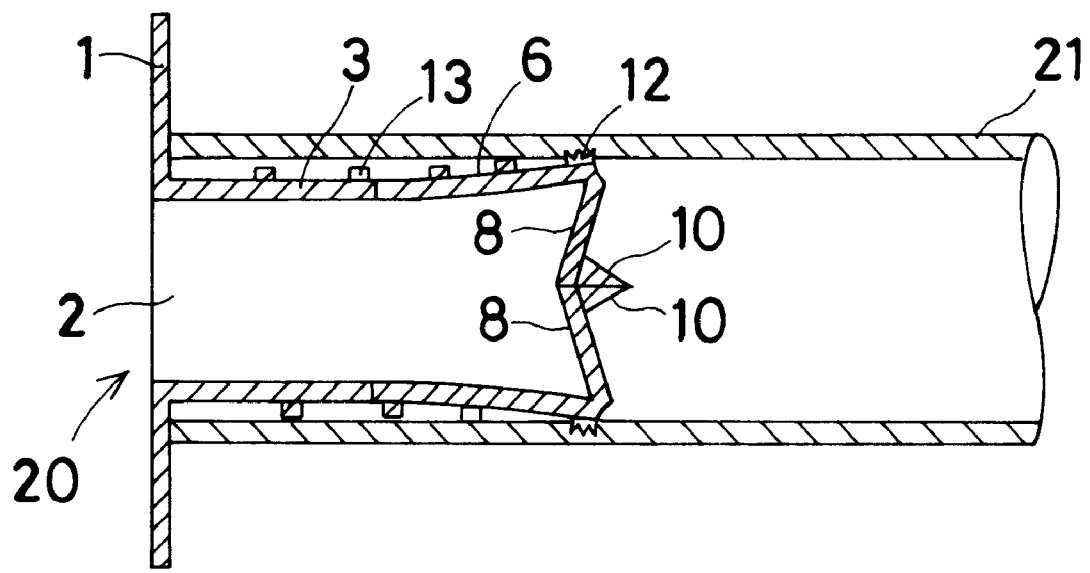
FIGS. 6(a) and (b) are views for illustrating how to detach the flange in FIG. 1 from the end of a roll of photosensitive material.
Figure 6B:
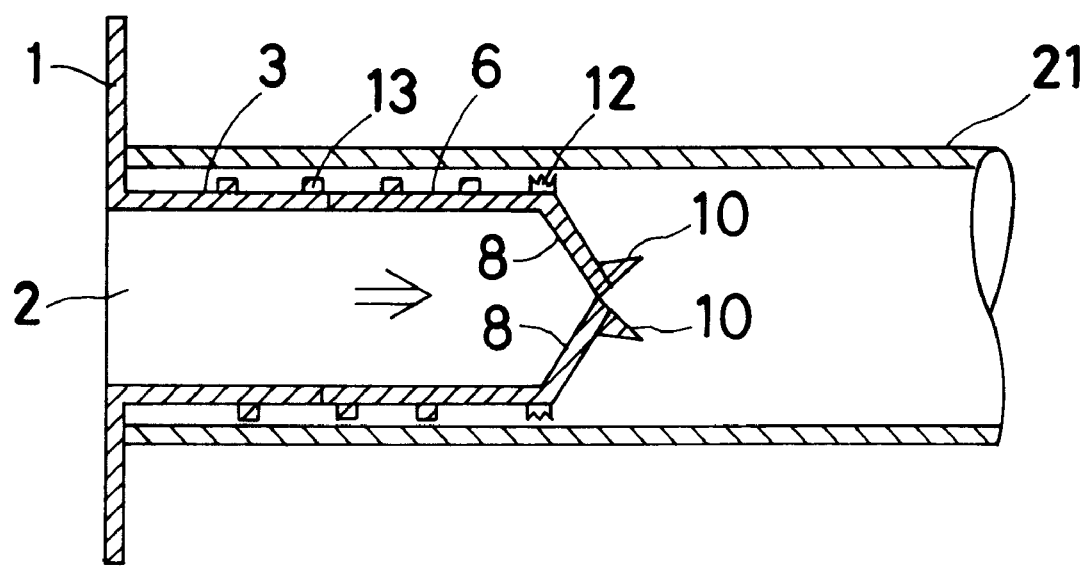

FIG. 5 illustrates the state of the flange 20 screwed in the paper tube 21 of the roll of photosensitive material 23 while it is in an expanded state. In this state, the external thread 13 is used to screw the flange in the paper tube 21. As a result, the expansion of the flexible segments 6 is forcibly reduced so that the struts 8 can be slightly flexed, and the protuberances 12 at the foremost ends of the flexible segments 6 and the external thread 13 are in engagement within the inner surface of the paper tube 21. Thus, the flange 20 remains firmly fixed to the paper tube 21 of the roll of photosensitive material 23 with no fear of disengagement therefrom.

In the FIG. 4 state, the flange 20 for hollow articles may be screwed in the end of the paper tube 21 while the flexible segments 6 in FIG. 2 are contracted. In some cases, however, it is not always easy to bring the struts 8 back to the FIG. 5 state after screwing to expand the protuberances 12 at the foremost ends of the flexible segments 6 in engagement within the inner surface of the paper tube 21. Depending on the available conditions, it is thus possible to make a selection from these options.

When the photosensitive material 22 is used up in the FIG. 5 state, the paper tube 21 is slightly expanded because of a release of the winding force of the photosensitive material 22. The paper tube 21 is also slightly expanded due to the force of the flexible segments 6 in their expanded state. In this state, the struts 8 are released from flexion and so become straight, and the protuberances 12 at the foremost ends of the flexible segments 6 are in slight engagement within the inner surface of the paper tube 21. When, in this state, the finger is inserted from the hole 2 in the disk 1, as shown by an arrow in FIG. 6(b), to give a push to the struts 8 along the center axis O–O', the struts 8 are placed beyond a change point into the FIG. 2 state. In this state, the flexible segments 6 are released from expansion, so that the protuberances 12 at the foremost ends of the flexible segments 6 can remain disengaged from the inner surface of the paper tube 21. In this state, the flange 20 is unfixed from the paper tube 21, so that it can be easily separated from the paper tube 21. When the protuberances 12 and the external thread 13 remain engaged within the paper tube 21, the flange can be easily unfixed by turning it counterclockwise around the center axis O–O'.

Figure 7:
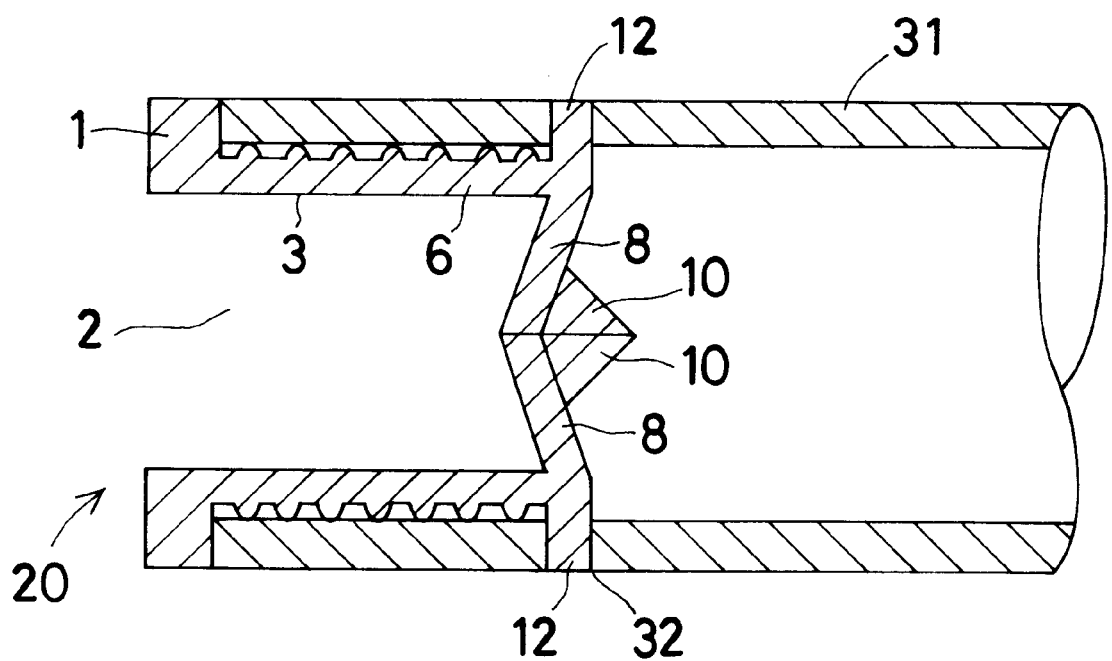
FIG. 7 is a view illustrating another embodiment of the resin flange according to the invention, which is attached to a metal pipe.

While the flange 20 for hollow articles according to the invention has been described as being attached to, and detached from, the end of the paper tube 21 of the roll of photosensitive material 23 , it is to be understood that the flange 20 may also be applied to the end of another hollow article. FIG. 7 is a sectional view of an embodiment of the resin flange 20 designed to be attached to an end face of a metal pipe 31. This embodiment is used as in the above embodiment. However, it is required that the metal pipe 31 be provided in given positions with holes or dents 32 within which protuberances 12 at the foremost ends of flexible segments 6 are engaged in an expanded state.

The present invention are now explained with reference to some embodiments.

Figure 8A:
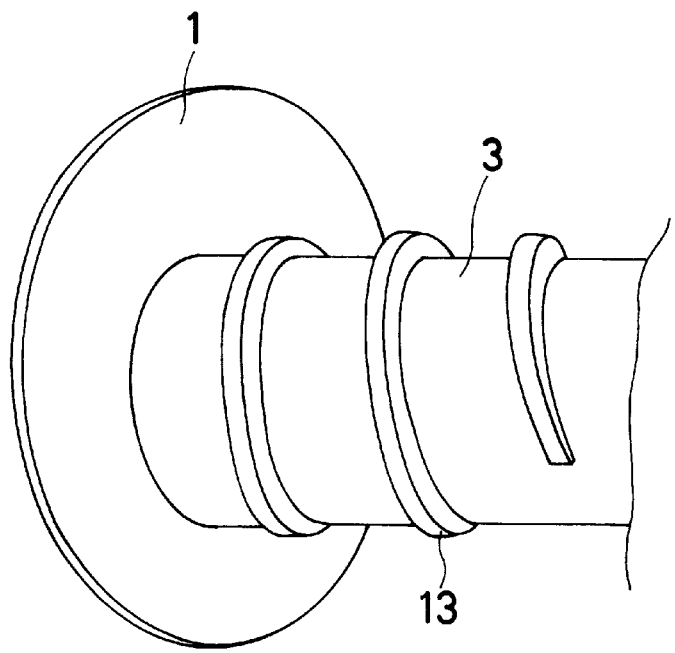
FIGS. 8(a) and (b) illustrates various embodiments of the flange of a hollow article according to the first aspect of the invention.
Figure 8B:
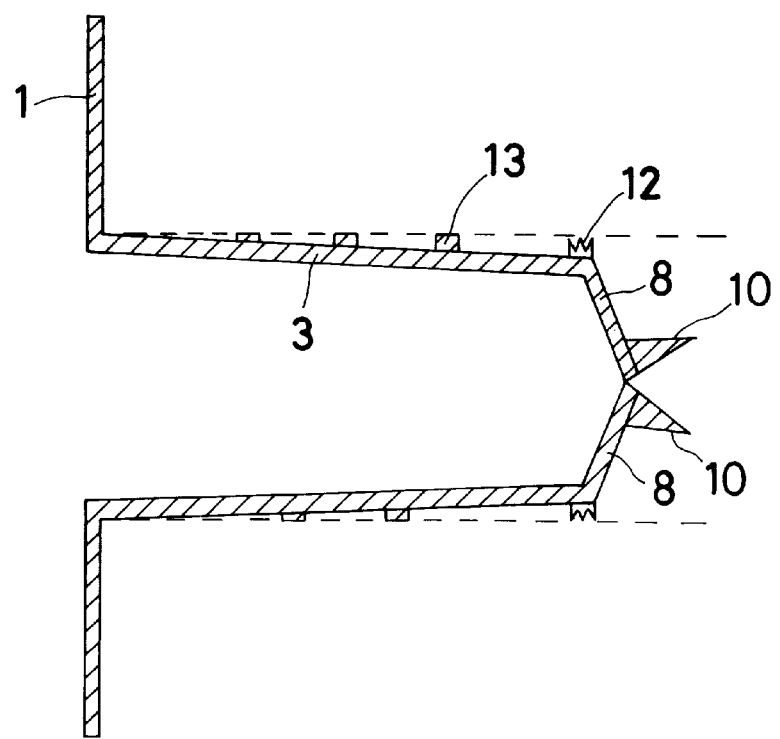

The outer diameter of the cylindrical inserting member 3 may be either constant or decrease gradually in the insertion direction, as shown in FIG. 8(b).

The height of the spiral external thread 13 may decrease gradually in the insertion direction, as shown in FIG. 8(a), or be kept constant.

For ease of insertion, it is preferable that the height of the spiral external thread 13 on the cylindrical inserting member 3 increases gradually from the foremost end, i.e., the end farthest from the disk 1, as shown in FIG. 8(a).

In a preferred embodiment of the invention, the outer diameter of the cylindrical inserting member 3 decreases gradually in the insertion direction and the height of the spiral external thread 13 increases gradually in the insertion direction, so that the upper face of the spiral external thread 13 can have the same height except at the foremost end, as shown in FIG. 8(b).

The protuberances 12 at the foremost end of each flexible segment 6 may be arranged in a dotted form. Alternatively, a linear form of protuberance may be arranged along the widthwise direction of each flexible segments 6 (FIG. 1).

The protuberances 12 and the external thread 13 may be selected from those having such sections as shown in FIGS. 18(a) to 18(h). To increase the force of engaging the cylindrical inserting member 3 in the paper tube 21, however, it is preferable to use as many protuberances capable of being engaged at its pointed ends within the paper tube 21 as possible.

Figure 9:
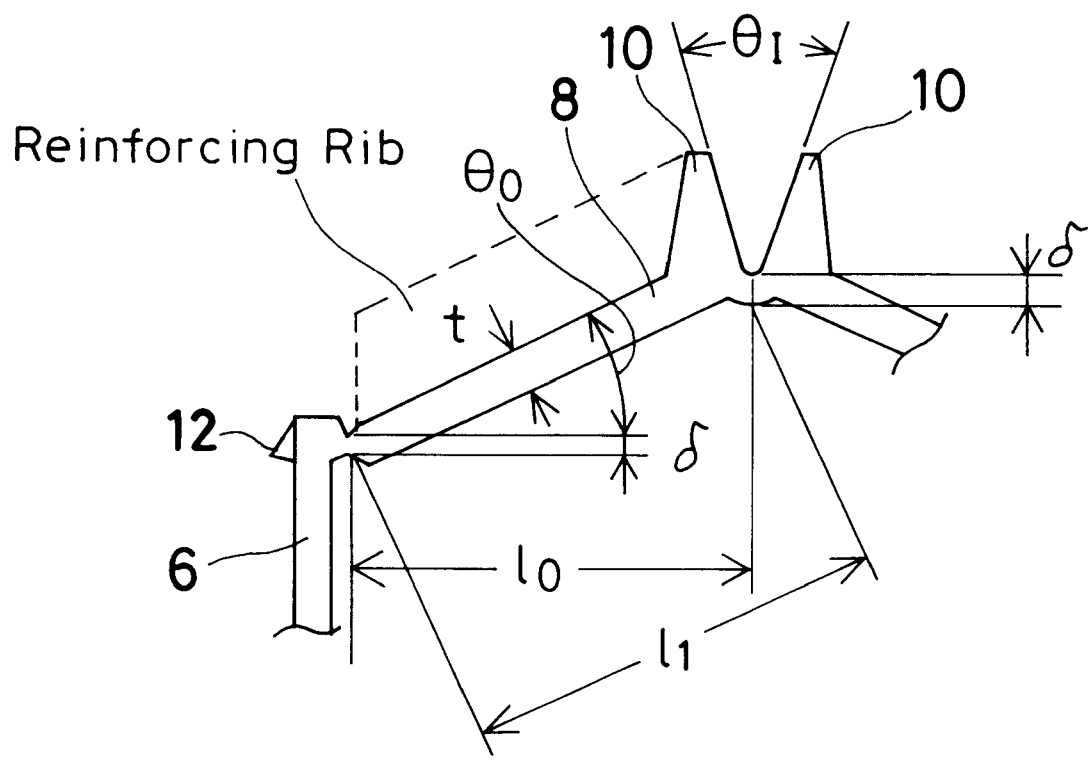
FIG. 9 is view for showing parameters concerning the shape of a strut.

To reinforce the strength of each strut 8, it is preferable to provide a rib along its lengthwise direction (FIG. 9).

The width of the strut 8 may be properly selected.

Preferably, the shape of the strut 8 is determined by the following ranges of parameters shown in FIG. 9.

| Parameter | Recommendable Range |
| --- | --- |
| δ | 0.3 to 1 mm |
| $l_1 - l_0$ | 0.1 to 1.0 mm |
| $\theta_0$ | 10 to 45° |
| $\theta_1$ | $2\theta_0 + 0$ to 30° |
| t | Reinforced with the rib to increase rigidity |

The present invention is now explained with reference to specific numerical values.

The flange having such a shape as shown in FIG. 8(b) was integrally molded of a carbon black-containing polystyrene resin. The strut 8 was molded with the following dimensions.

| Parameter | |
| --- | --- |
| δ | 0.5 mm |
| $l_1-l_0$ | 0.75 mm (25.75–25 mm) |
| $\theta_0$ | 15° |
| $\theta_1$ | 40° |
| t | 2 mm |

The strut 8 had a width of 20 mm, and the protuberance 12 was in a linear form of 20 mm in width.

After a photosensitive material was wound around a 2 mm-thick paper tube in a rolled-up state, the above flange was forced and inserted in the paper tube.

Figure 10:
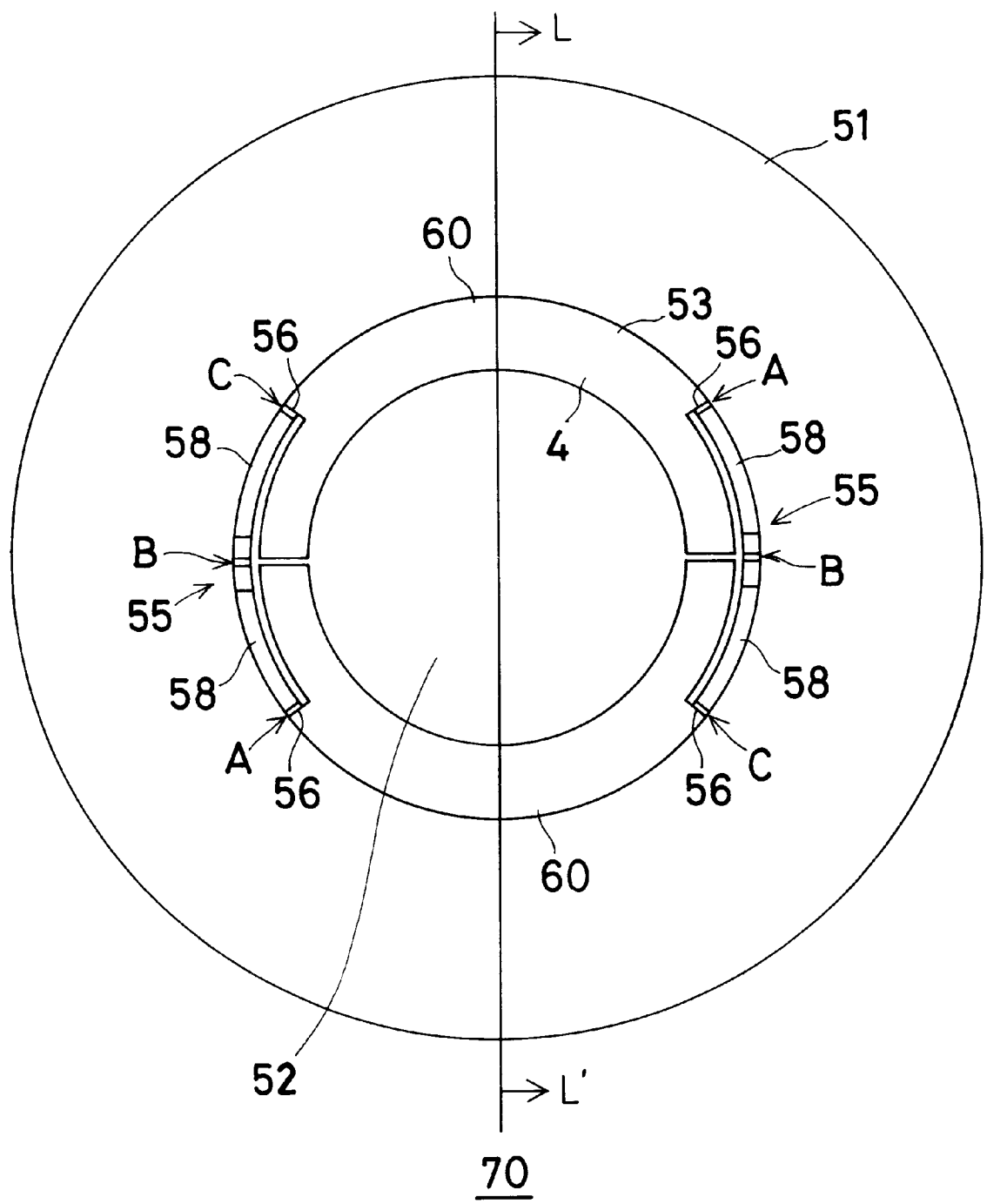
FIG. 10 is a front view of another embodiment of the flange for a hollow article according to the invention.

FIG. 10 is a front view of another embodiment of the flange for hollow articles according to the invention, i.e., a flange 70, and FIG. 11 is a sectional view of the flange 70, taken along a center axis thereof and an L–L' line in FIG. 10, for the purpose of illustrating the action of this embodiment. All parts of this flange 70 for hollow articles are integrally molded of plastics, and the flange 70 comprises a disk (flange) 51 having a concentric hole 52 in its center and a hollow cylindrical inserting member 53 which extends from the hole 52 in the disk 51 along a center axis O–O' by a certain distance. To increase the rigidity of this cylindrical inserting member 53, a ring-like member 54 extends from the foremost end of the cylindrical inserting member 53 in the center axis O–O' direction.

In two positions at the foremost end of the cylindrical inserting member 53, which are opposite to each other with respect to the center axis O–O', there are cutouts 55 formed by cutting out the cylindrical wall of the cylindrical inserting member 53 from its foremost end. In the cutout 55, only the ring-like member 54 remains intact. However, the ring-like member 54 is divided at a position corresponding to a substantially central portion of the cutout 55.

Each cutout 55 is surrounded with an edge of the foremost end of the cylindrical inserting member 53 that is in contact with the ring-like member 54, side edges 56 and 56 parallel with and opposite to the center axis O–O', and a bottom edge 57 opposite to the edge of the foremost end of the cylindrical inserting member 53. In the cutout 55, there are symmetrically provided two rocking segments 58 and 58, which have the same thickness and curvature as those of the cylindrical wall of the cylindrical inserting member 53, and are symmetric in the outside shape. One rocking segment 58 is coupled to one side edge 56 at a coupling point A, another rocking segment 58 is coupled to another side edge 56 at a coupling point C, and both rocking segments 58 are coupled to each other at a coupling point B. The cylindrical inserting member 53 is provided with split grooves 59 and 59, which extend from the opposite side edges 56 and 56 of the cutout 55 toward the disk 51. Expandable portions 60 and 60 (at symmetric positions with the center axis O–O' located between them) of the cylindrical inserting member 53 sandwiched between the adjoining side edges 56 and split grooves 59 of both cutouts 55 and 55 can be flexed by the split grooves 59, so that they can be outwardly flexed and expanded.

Figure 11A:
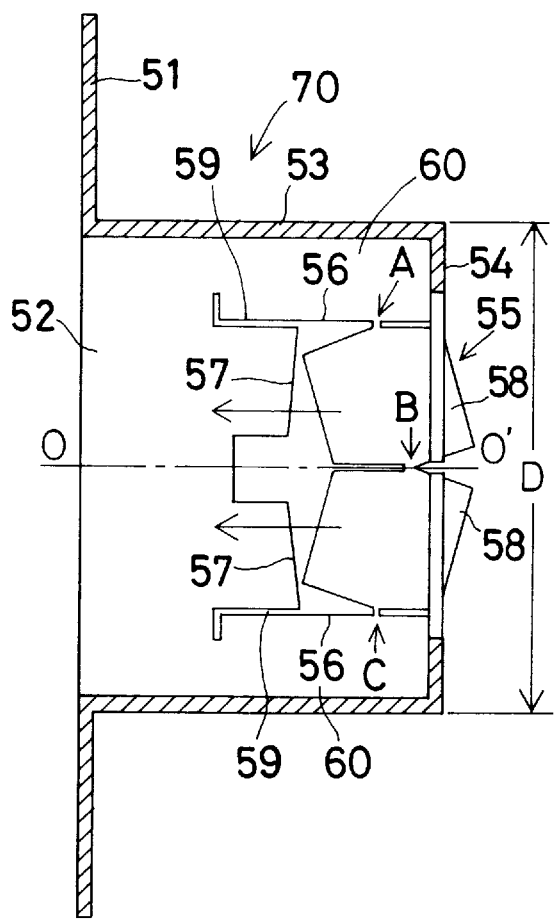
FIGS. 11(a) and (b) are sectional views of the flange for a hollow article shown in FIG. 1, taken along a straight line L–L' of FIG. 10 and a center axis thereof, and for illustrating the action of this flange.
Figure 11B:
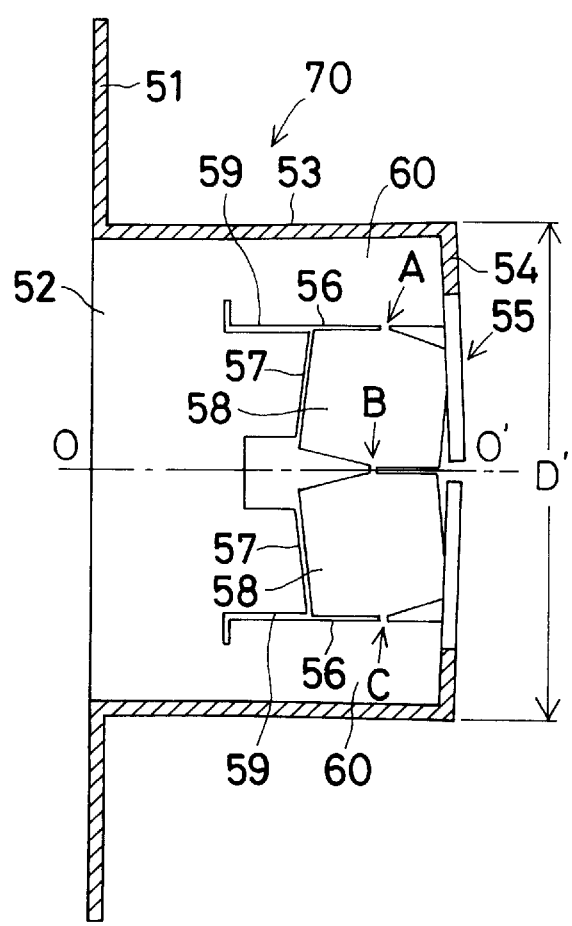

FIGS. 10 and 11(a) illustrate the state wherein the disk 51, cylindrical inserting member 53, expandable portions 60, ring-like member 54 and rocking segments 58 are integrally molded, and the diameter of the foremost end of the cylindrical inserting member 53 is not expanded. As illustrated, the cylindrical inserting member 53, expandable portions 60 and rocking segments 58 are positioned in such a manner that they provide a hollow shell structure along one cylindrical surface. FIG. 11(b) illustrates the state wherein the rocking segments 58 and 58 are turned toward the disk 51 beyond a change point while the coupling points A and C are used as fulcrums. In the state shown in FIG. 11(b), the diameter of the foremost end of the cylindrical inserting member 53 is increased. This mechanism is now explained in more detail.

In the non-expanded state shown in FIG. 11(a), the angle AB makes with BC, for instance, is 150°. When, in the state shown in FIG. 11(a), the rocking segments 58 and 58 are pulled toward the disk 51 as shown by arrows, the rocking segments 58 and 58 are turned with the coupling points A and C acting as fulcrums, while they remain coupled to each other at the coupling point B, and then go beyond the change point until they abut on the bottom edges 57 of the cutouts 55, so that they can be kept stationary in the state shown in FIG. 11(b). If the angle AB makes with BC in the FIG. 11(a) state, for instance, is 150° and the angle AB makes with BC in the FIG. 11(b) state, for instance, is −170°, the expandable portions 60 can then be expanded by outward flexion. Here assume that AB=BC=25 mm in the above angle relation. Then, AC is 48.3 mm in the FIG. 11(a) state, and 49.8 mm in the FIG. 11(a) state. Again assume that the diameter D of the foremost end of the cylindrical inserting member 53 in the FIG. 11(a) non-expanded state is 71 mm. When one cutout 55 is provided, the diameter D' in FIG. 11(b) increases by 49.8−49.3=0.5 mm (length of circumference), i.e., 0.5÷3.14≈0.16 mm; that is, the diameter D' is 71.16 mm. When two cutouts 55 are provided as in FIG. 10, the diameter D' is 71.32 mm. Thus, as long as the absolute value of the angle AB makes with BC in the FIG. 11(b) state is larger than the absolute value of the angle AB makes with BC in the FIG. 11(a) state, the length of circumference of the foremost end of the cylindrical inserting member 53 is so increased that the diameter of the foremost end of the cylindrical inserting member 53 can be D<D' or the diameter of the cylindrical inserting member 53 in the FIG. 11(b) state can be increased. It is to be noted that in the FIG. 11(b) expanded state, too, the cylindrical inserting member 53, expandable portions 60 and rocking segments 58 provide a hollow shell substantially along one cylindrical surface.

Figure 12A:
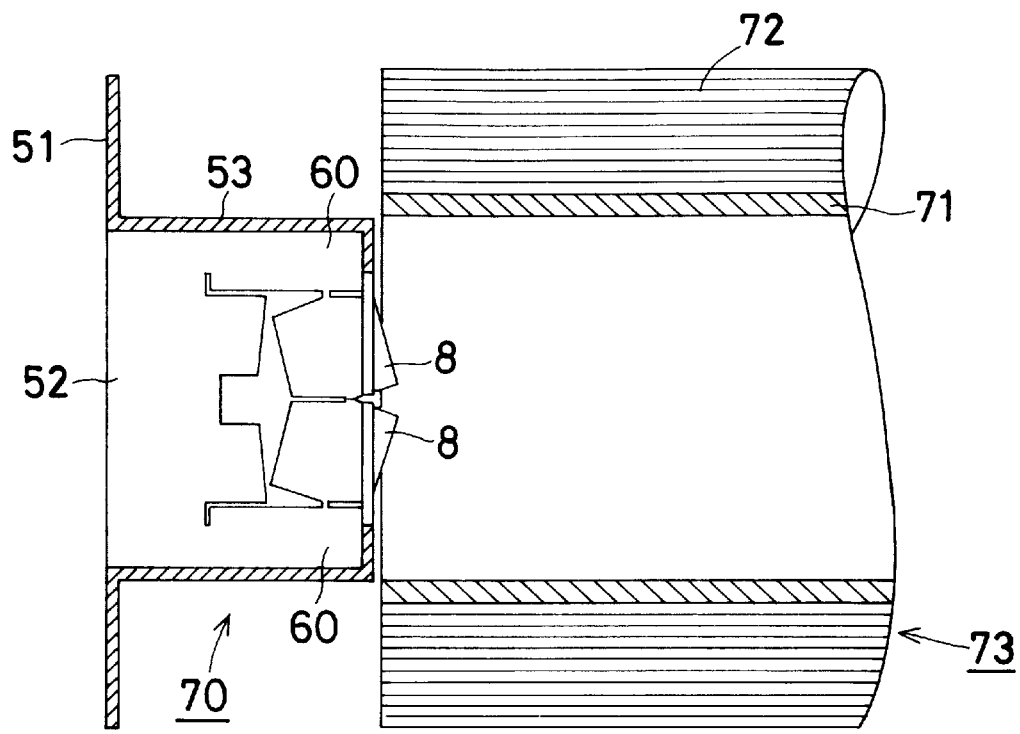
FIGS. 12(a) and (b) are views of the flange for a hollow article shown in FIG. 1, before and after attached to an end of a roll of photosensitive material.
Figure 12B:
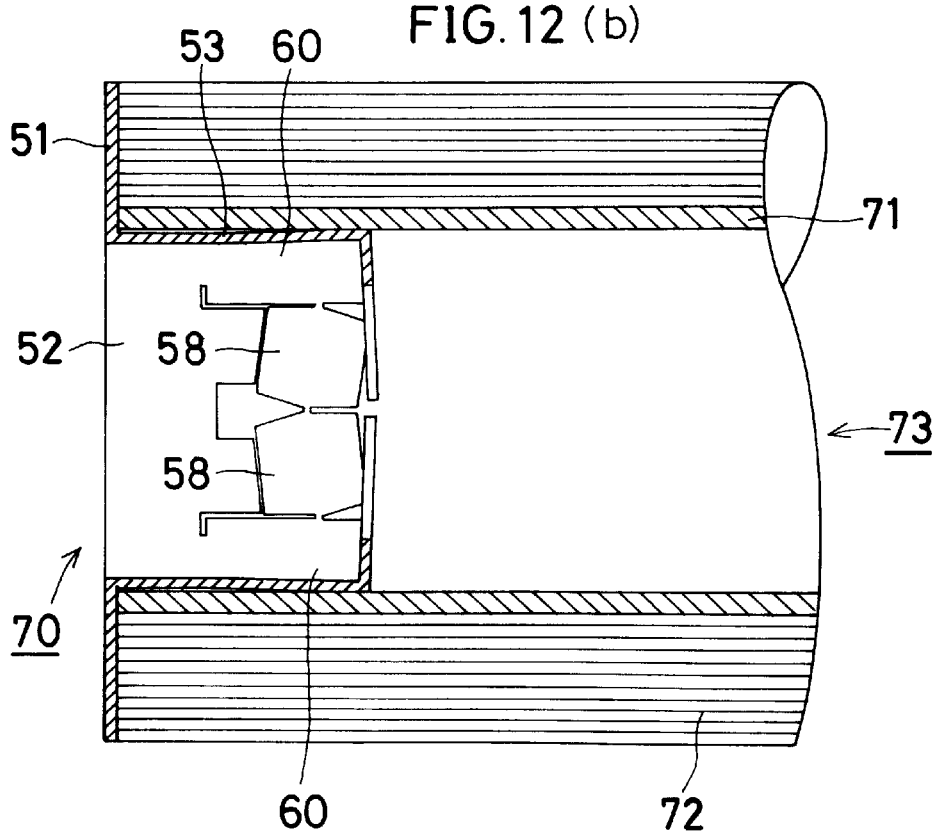

To attach the above flange 70 for hollow articles to the end of a roll of photosensitive material 73 in which a long length of photosensitive material 72 such as photographic paper or photosensitive film is wound around a hollow paper tube 71 serving as a core rod, as shown in FIG. 12, the flange 70 is inserted at the cylindrical inserting member 53 into the end of the paper tube 71 in the FIG. 11(a) as-non-expanded state, as depicted in FIG. 12(a). As depicted in FIG. 12(b), a jig is then inserted from the hole 52 into the cylindrical inserting member 53 to pull the rocking segments 58 and 58 toward the disk 51 and turn them into the FIG. 11(b) expanded state. In this state, the foremost end of the cylindrical inserting member 53 of the flange 70 is of so an increased diameter that it can be firmly engaged within the paper tube 71 at the end of the roll of photosensitive material 73, with no fear of disengagement.

It is here to be noted that if the foremost ends of the expandable portions 60 are provided therearound with protuberances to be engaged within the inner surface of the paper tube 71, it is then possible to more firmly fix the flange 70 to the end of the paper tube 71.

After the photosensitive material 72 is used up in the FIG. 12(b) state, another or the same jig is inserted from the hole 52 into the cylindrical inserting member 53 to turn the rocking segments 58 and 58 in a direction facing away from the disk 51, thereby allowing the rocking segments 58 and 58 to go back to the original state depicted in FIG. 11(a), so that the flange 70 can be disengaged, and so easily separated, from the end of the paper tube 71.

Figure 13:
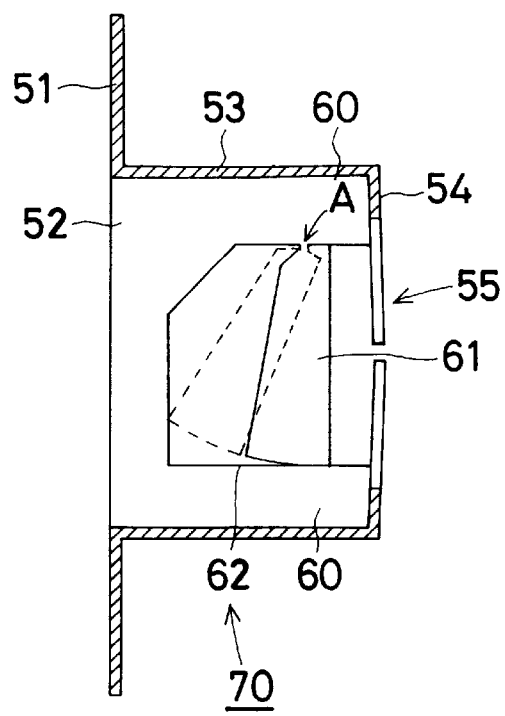
FIG. 13 is a view, similar to FIG. 11, of another embodiment of the flange for a hollow article.

FIG. 13 is a view, similar to FIG. 11, of another embodiment of the flange 70 for hollow articles. In this embodiment, a cylindrical wall of a cylindrical inserting member 53 is cut out from its foremost end to form a concave cutout 55 in which one rocking segment 61 is disposed and coupled to one expandable portion 60 at a coupling point A so that it can turn between a solid line and a broken line in FIG. 13, with the coupling point A serving as a fulcrum. When this flange 7 for hollow articles is integrally molded, the rocking segment 61 is positioned at the broken line in FIG. 13, and the foremost end of the cylindrical inserting member 53 is placed in a non-expanded state, as in FIG. 11(a). When the rocking segment 61 is turned into the solid line position with the coupling point A serving as a fulcrum, the foremost end of the rocking segment 61 is abutted on, and propped up by, the opposite side edge 62 of the cutout 55, causing outward flexion of the expandable portion 60, so that the foremost end of the cylindrical inserting member 53 is placed into an expanded state, as in FIG. 11(b). Thus, fixation of the flange 70 to the end of the core paper tube 71 of a roll of photosensitive material 73, and disengagement and separation of the flange 70 from the end of the core paper tube 71 can be easily done.

Figure 14:
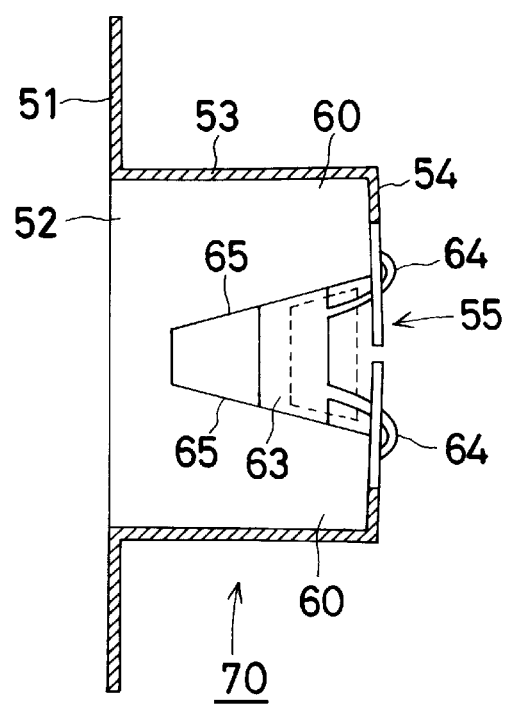
FIG. 14 is a view, similar to FIG. 11, of yet another embodiment of the flange for a hollow article.

FIG. 14 is a view, similar to FIG. 11, of yet another embodiment of the flange 70 for hollow articles. In this embodiment, a cylindrical inserting member 53 is provided in its foremost end with a cutout 55 which becomes wide toward its foremost end in a V-shaped manner. In the cutout 55 there is disposed one wedge segment 63. The wedge segment 63 is coupled to the foremost end of the cylindrical inserting member 53 by means of a strap 64. When the flange 70 for hollow articles is integrally molded with the wedge segment 63, the cutout 55 becomes wide toward its foremost end. In the cutout 55 the wedge segment 63 is then located at a position shown by a broken line in FIG. 14, so that the foremost end of the cylindrical inserting member 53 can be placed in a non-expanded state as in FIG. 11(a). When a jig is inserted from a hole 52 into the cylindrical inserting member 53 to pull the wedge segment 63 to a solid line position, the wedge segment 63 is moved along both side edges 65 of the cutout 55, causing outward enlargement of the V-shaped cutout 55 and so outward flexion of an expandable portion 60, so that the foremost end of the cylindrical inserting member 53 can be placed into an expanded state, as in FIG. 11(b). Thus, fixation of the flange 70 to the end of the core paper tube 71 of a roll of photosensitive material 73, and disengagement and separation of the flange 70 from the end of the core paper tube 71 can be easily done.

In the embodiments shown in FIGS. 10 to 14, the ring-like members 54 are provided on the insides of the foremost ends of the expandable portions 60 of the cylindrical inserting member 53 to maintain their rigidity. Even when the expandable portions 60 and 60 are placed into their expanded state, therefore, they maintain their semi-circular outside shape. In other words, where the expandable portions 60 and 60 are spaced away from each other under the action of the rocking segments 58 and 58 to enlarge the circumference of the foremost end of the cylindrical inserting member 53, the foremost end of the cylindrical inserting member 53 takes on an ellipse form as a whole. Not only is large force necessary to enlarge the circumference of the foremost end of the cylindrical inserting member 53, but the paper tube 71 and photosensitive material 72 (FIG. 12) also undergo local deformation, resulting often in pressure marks on the photosensitive material 72 .

Figure 15:
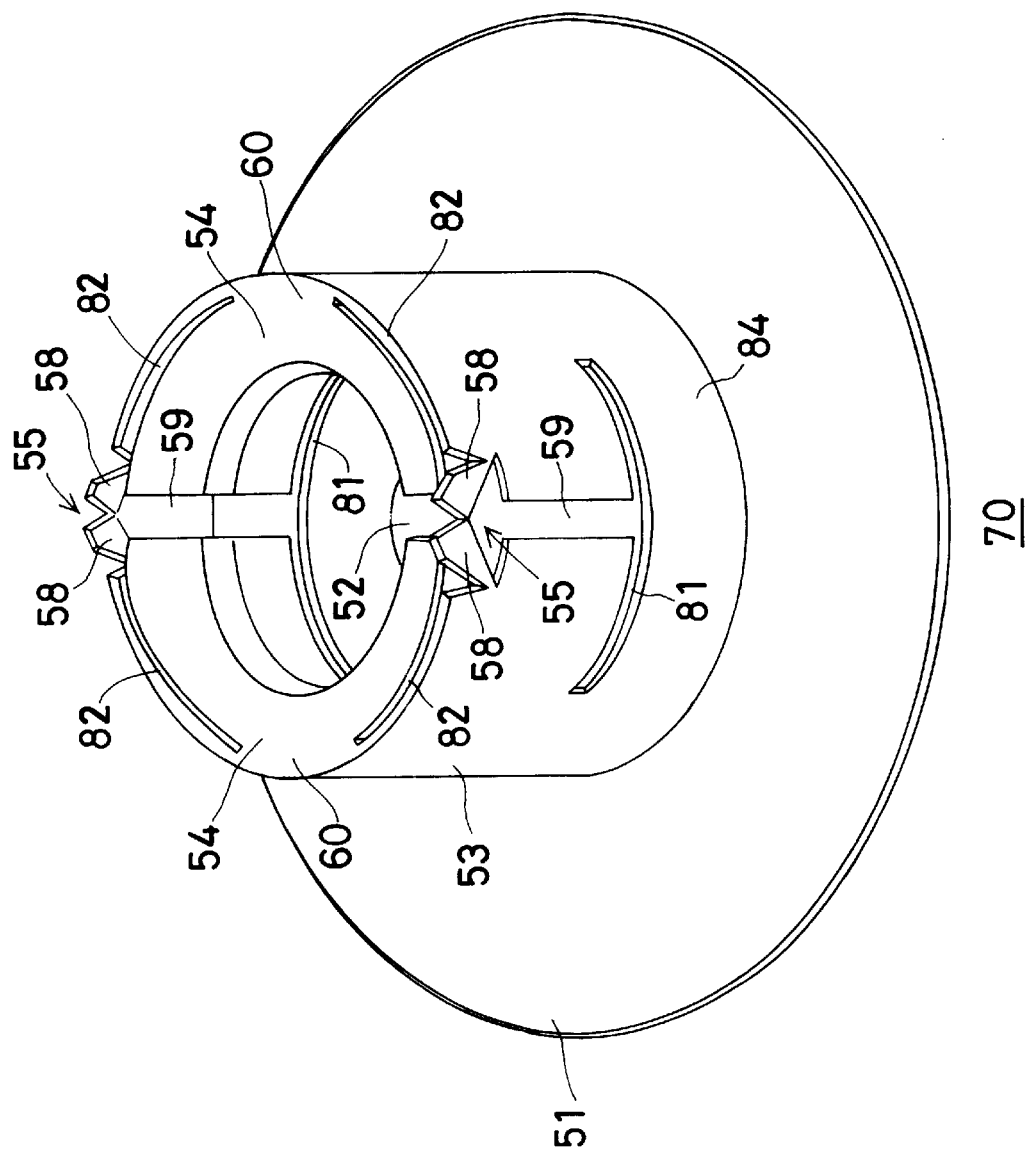
FIG. 15 is a perspective view of a modification of the embodiment of the flange for a hollow article shown in FIGS. 10 and 11.

FIG. 15 is a perspective view of an embodiment designed to solve this problem. In this embodiment, too, rocking segments 58 and 58 are provided as explained with reference to FIGS. 10 and 11. However, the rocking segments 58 and 58 are relatively smaller in size than those in FIGS. 10 and 11, although they act in the same manner as those in FIGS. 10 and 11. In this embodiment, however, there is provided a single split groove 59 which extends in the axial direction of a cylindrical inserting member 53 in each cutout 55. Each split groove 59 is provided with a circumferential groove 81 which is contiguous to the split groove 59 and extends in both opposite circumferential directions. Expandable portions 60 and 60 of the cylindrical inserting member 53 are defined with adjoining side edges of both cutouts 55 and 55, the split grooves 59, and the grooves 81. The expandable portions 60 and 60 are enlarged outwardly or contracted inwardly by the rocking of rocking segments 58 and 58, as in FIG. 11(b) or 11(a).

In this embodiment, between a ring-like member 54 provided on the inside of the foremost end of each expandable portion 60 and the foremost end of the cylindrical inserting member 53, there are provided slits 82 which extend from each cutout 55 to certain points, thereby diminishing the sectional area of coupling the cylindrical inserting member 53 to the ring-like member 54, and so lowering the rigidity of the foremost end of the expandable portion 60. Thus, even when the expandable portions 60 and 60 are spaced away from each other to enlarge the circumference of the foremost end of the cylindrical inserting member 53, the foremost end of the expandable portion 60 maintains its semi-circular shape, and so the foremost end of the cylindrical inserting member 53 takes a circular shape as a whole.

In the modified embodiment shown in FIG. 15, however, the slit 82 located between the ring-like member 54 and the foremost end of the cylindrical inserting member 53 may lead to another problem. That is, the provision of the slit 82 makes the expandable portion 60 likely to flex. When, in the state where the rocking segments 58 and 58 are turned to the FIG. 11(b) position to space the expandable portions 60 and 60 away from each other in a stable manner, mutually torsional forces are applied from outside on the expandable portions 60 and 60, there is a misalignment between the expandable portions 60 and 60, which in turn causes the rocking segments 58 and 58 to be spontaneously disengaged from each other, going back to the FIG. 11(a) non-expanded state. Otherwise stated, the rocking segments 58 and 58 are likely to be disengaged from each other.

Figure 16:
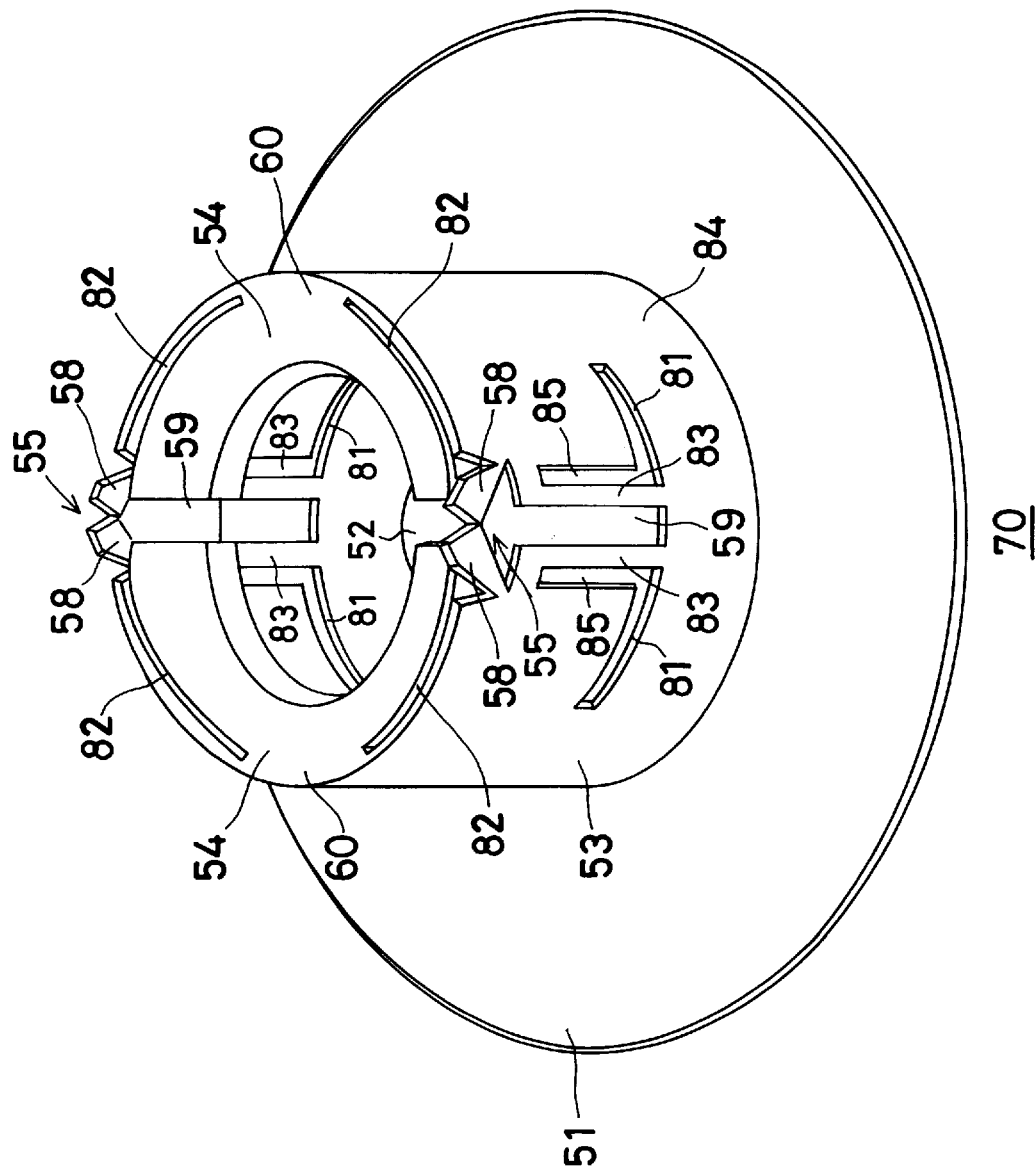
FIG. 16 is a perspective view of one modification of the embodiment of the flange for a hollow article shown in FIG. 15.

FIG. 16 illustrates an embodiment designed to solve this problem. As explained with reference to FIG. 15, the expandable portions 60 and 60 are likely to flex due to the presence of the split grooves 59 and circumferential grooves 81 between the expandable portions 60 and 60. To reinforce the vicinity of the cutouts 55 in the expandable portions 60, connecting struts 83 and 83 for connecting a root 84 of a cylindrical inserting member 53 divided by circumferential grooves 81 and contiguous to a disk 1 to each expandable portion 60 are located between the root 84 and the expandable portions 60 and 60 at the foremost end thereof and on both sides of split grooves 59 , as shown in FIG. 16. Then, the circumferential grooves 81 terminate at the positions of the connecting struts 83, and longitudinal grooves 85 extend from the positions of the connecting struts 83 facing away from the split grooves 59 to the circumferential grooves 81.

This embodiment is used as follows. When the expandable portions 60 and 60 are spaced away from each other under the action of the rocking segments 58 and 58 , the foremost end of each expandable portion 60 maintains its semi-circular shape due to the presence of the slit 82, so that the foremost end of the cylindrical inserting member 53 can have a circular shape as a whole. Even when mutually torsional forces are applied from outside on the expandable portions 60 and 60, a misalignment between the expandable portions 60 and 60 is unlikely to occur because of the presence of the connecting struts 83 and 83 that connect the root portions 84 on both sides of the split groove 84 to the expandable portions 60 and 60, so that the expandable portions 60 and 60 can remain spaced away from each other.

Figure 17:
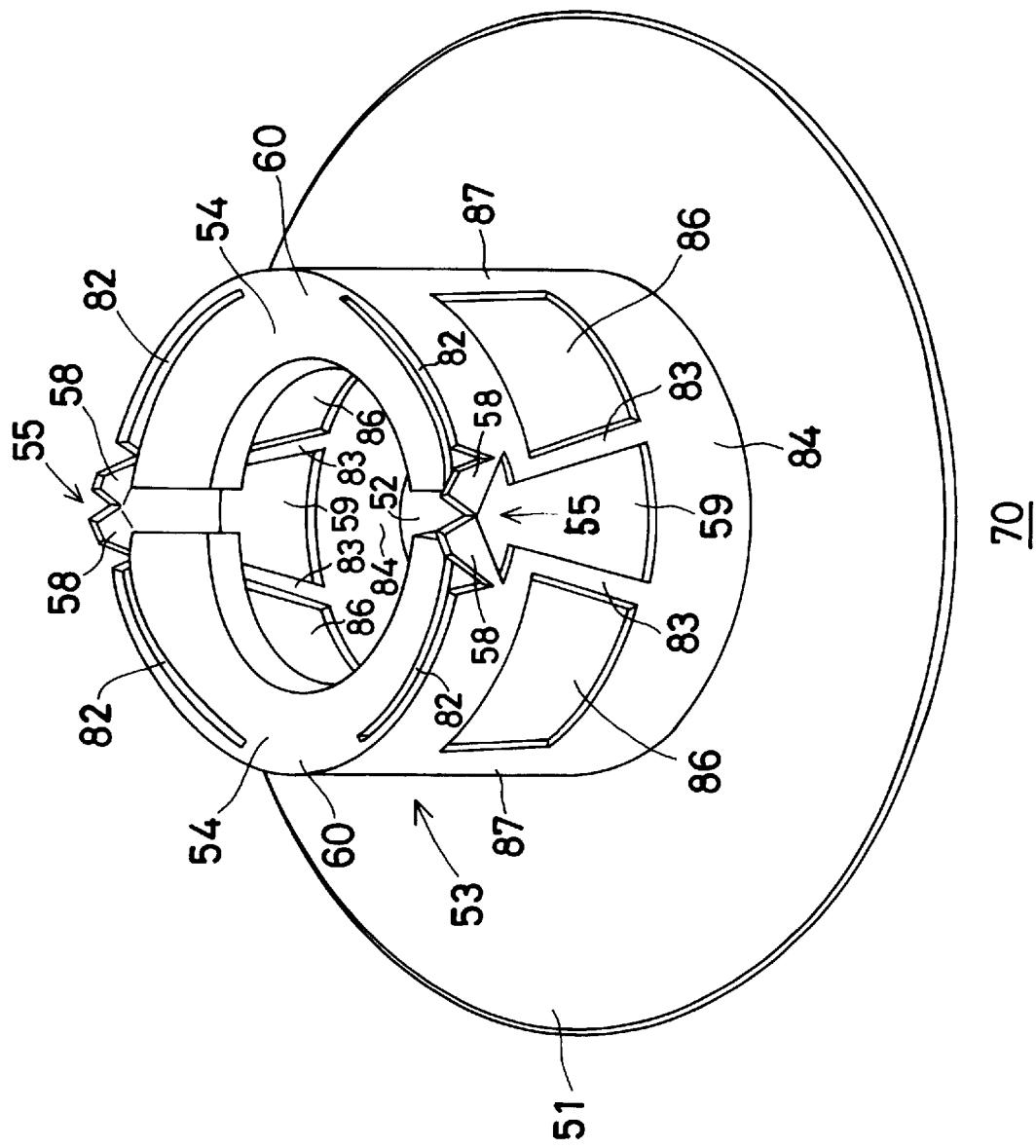
FIG. 17 is a perspective of another modification of the flange for a hollow article shown in FIG. 16.

To place the foremost end of the cylindrical inserting member from the FIG. 11(a) non-expanded state to the FIG. 11(b) expanded state and vice versa, a jig is inserted from the hole 52 therein to pull the rocking segments 58 and 58 toward the disk 51 or turn them in the direction opposite to the disk 51. To this end it is required that the rocking segments 58 and 58 be visible through the hole 52, and the jig be so easy to handle that it can gain easy access to the rocking segments 58 and 58. In the embodiments shown in FIGS. 15 and 16, however, it is not easy to look at the position and state of the rocking segments 58 and 58 because the split groove 59 extending in the axial direction of the cylindrical inserting member 53 is a relatively fine slit groove of the same width. FIG. 17 illustrates an embodiment designed to provide a solution to this problem. As illustrated, there is provided a split groove 59 which has an increasing width in the vicinity of rocking segments 58 and 58 and an increasing width toward a root 84. It is thus possible to look at the rocking segments 58 and 58 through a hole 52 in a disk 51, and for a jig to gain easy access to the rocking segments so that they can be easily turned by means of the jig.

In the FIG. 17 embodiment, the circumferential groove 81 in FIG. 16 and a longitudinal groove 85 leading thereto are defined by openings 86 formed by cutting out a cylindrical wall of a cylindrical inserting member 53, leaving a connecting strut 83 and a flexible segment 87 on both sides thereof, rather than by grooves. In this arrangement, a flange 70 for hollow articles comprises a disk (flange) 51 having a concentric hole 52 in its center, and a hollow cylindrical inserting member 53 extending along a center axis thereof by a certain distance. The cylindrical inserting member 53 comprises a cylindrical root 84 and two expandable portions 60 and 60, coupled to the cylindrical root 84 through three struts 83, 87 and mutually outwardly flexible and expandable against resiliency with the center axis located between them. Then, a set of rocking segments 58 and 58 are provided at two opposite positions between the expandable portions 60 and 60 to space them away from each other or bring them back to the original positions. A center strut 86 located between the cylindrical root 84 and one expandable portion 60 bears action of resiliently flexing the expandable portion 60 with respect to the cylindrical root 84, and both struts 83 and 83 located between the cylindrical root 84 and one expandable portion 60 bears action of preventing a misalignment between the expandable portions 60 and 60 with the rocking segments 58 and 58 formed thereon.

It is here to be understood that the arrangements shown in FIGS. 15 and 16 are also applicable to the flanges 70 for hollow articles, shown in FIGS. 13 and 14.

While the above flanges 70 for hollow articles have been described as being attached to, and detached from, the end of the paper tube 71 of a roll of photosensitive material 73, it is to be understood that these flanges 70 may also be used as flanges for the end of another hollow article, e.g., a metal pipe.

In the above embodiments, no detailed reference is made to the jig for moving the rocking segments 58, 61, and the wedge segments 63. However, it is to be understood that use may be made of any desired jig capable of being engaged through the hole 52 with the rocking segments 58, 61, and the wedge segments 63; any special jig is not needed.

While the flange for a hollow article according to the invention has been described with reference to its preferred embodiments, it is to be understood that the invention is not limited thereto; many modifications and applications may be possible.

The flange for hollow articles according to the first aspect of the invention includes a mechanism provided between the two flexible segments for spacing the foremost ends of the two flexible segments away from each other or bringing them back to the original positions thereof, wherein external protuberances on the foremost ends of the flexible segments are engaged with the inner surface of the end of the hollow article while the flexible segments are spaced away from each other to attach the flange for a hollow article to the end of the hollow article, and the flange for a hollow article is detachable from the end of the hollow article while the flexible segments are brought back to the original positions. Thus, the flange can be separated from the hollow article in simple one-touch operation; after a roll of photosensitive material or the like is used up, the flange can be discarded apart from the hollow article such as a paper tube to the end of which the flange is attached, and which is formed of material different from that of the flange.

In the flange for a hollow article according to the second or third aspect of the invention, at least one cutout provided in the foremost end of the cylindrical inserting member by cutting out a foremost edge thereof in a concave form is provided therein with a rocking or sliding segment that is engaged with a side edge of the cutout to enlarge a length of circumference of the foremost end of the cylindrical inserting member or bring the length of circumference back to the original length thereof, so that while the length of circumference of the foremost end of the cylindrical inserting member is enlarged, the flange for a hollow article is attached to the end of the hollow article, and while the length of circumference of the foremost end of the cylindrical inserting member is brought back to the original length, the flange for a hollow article is detached from the end of the hollow article. Thus, the flange can be attached to, and separated from, the hollow article in simple one-touch operation; after a roll of photosensitive material or the like is used up, the flange can be discarded apart from the hollow article such as a paper tube to the end of which the flange is attached, and which is formed of material different from that of the flange. In addition, the mechanism for increasing the diameter of the foremost end of the cylindrical inserting member or bringing it back to the original diameter does not project into the cylindrical space of the flange, so that the cylindrical space can be used for accommodating a driving mechanism for driving a roll of photosensitive material.

What we claim is:

1. A flange for a hollow article detachably attached to an end of a pipe-like hollow article, characterized by comprising a disk having a concentric hole in a center thereof, a hollow cylindrical inserting member extending directly from said hole in said disk or extending from said hole in said disk along a center axis thereof, and two flexible segments extending from said hollow cylindrical inserting member in a cantilevered manner, and symmetrically with respect to said center axis and along said center axis, and including a mechanism provided between said two flexible segments for spacing foremost ends of said two flexible segments away from each other or bringing them back to original positions thereof, wherein external protuberances on the foremost ends of said flexible segments are engaged with an inner surface of the end of said hollow article while the foremost ends of said flexible segments are spaced away from each other to attach said flange for a hollow article to the end of said hollow article, and said flange for a hollow article is detachable from the end of said hollow article while the foremost ends of said flexible segments are brought back to said original positions.

2. A flange for a hollow article according to claim 1, characterized by further comprising an inwardly foldable strut joined to the foremost end of each of said flexible segments, said strut inwardly foldable along a folding line, being somewhat longer than a radius of said hole in said disk or said hollow cylindrical inserting member, and having a protuberant piece at a foremost end thereof, wherein said protuberant pieces are positioned such that when said strut segments are folded inwardly beyond a change point to bring said protuberant pieces in abutment on each other, thereby making folding of said strut segments stable and spacing said flexible segments away from each other.

3. A flange for a hollow article according to claim 1, characterized in that said flexible segments extend from said hollow cylindrical inserting member in a cantilevered manner, and symmetrically with respect to said center axis and along said center axis, and said hollow cylindrical inserting member is provided therearound with a spiral external thread.

4. A flange for a hollow article according to claim 2, characterized in that said flexible segments extend from said hollow cylindrical inserting member in a cantilevered manner, and symmetrically with respect to said center axis and along said center axis, and said hollow cylindrical inserting member is provided therearound with a spiral external thread.

5. A flange for a hollow article according to claim 3, characterized in that said hollow inserting member has a diameter decreasing in an insertion direction thereof, and said spiral external thread has a height increasing in said insertion direction.

6. A flange for a hollow article according to claim 1, characterized by being detachably attached to an end of a core paper tube of a roll of photosensitive material, around which a long length of photosensitive material is wound.

7. A flange for a hollow article detachably attached to an end of a pipe-like hollow article, comprising a disk having a concentric hole in a center thereof and a hollow cylindrical inserting member extending from said hole along a center axis thereof, characterized by comprising at least one cutout provided in a foremost end of said cylindrical inserting member by cutting out a foremost edge thereof in a concave form, wherein said cutout is provided therein with a rocking or sliding segment that is engaged with a side edge of said cutout to enlarge a length of circumference of the foremost end of said cylindrical inserting member or bring said length of circumference back to an original length thereof, so that while the length of circumference of the foremost end of said cylindrical inserting member is enlarged, said flange for a hollow article is attached to the end of said hollow article, and while the length of circumference of the foremost end of said cylindrical inserting member is brought back to the original length, said flange for a hollow article is detached from the end of said hollow article.

8. A flange for a hollow article according to claim 7, characterized in that two such cutouts are provided with the center axis of said hollow inserting member located therebetween.

9. A flange for a hollow article according to claim 7, characterized in that two symmetrical rocking segments having a symmetrical outside shape are provided symmetrically within opposite side edges of said cutout, one rocking segment being coupled to one side edge at one coupling point, another rocking segment being coupled to another side edge at another coupling point, and said rocking segments being coupled to each other at one coupling point, so that both said rocking segments can be turned between two positions and back and forth along said center axis with a change point located therebetween, thereby enlarging the length of circumference of the foremost end of said cylindrical inserting member or bringing said length of circumference to said original length of circumference.

10. A flange for a hollow article according to claim 7, characterized in that one rocking segment is provided in said cutout while it is coupled to one side edge of said cutout at one coupling point, so that said rocking segment can be turned between two positions and back and forth along a cylindrical wall of said cylindrical inserting member, thereby enlarging the length of circumference of the foremost end of said cylindrical inserting member or bringing said length of circumference back to said original length of circumference.

11. A flange for a hollow article according to claim 7, characterized in that one sliding segment is provided in said cutout while it is coupled to one side edge of said cutout at one coupling point, so that said rocking segment can be slid between two positions and back and forth along a cylindrical wall of said cylindrical inserting member, thereby enlarging the length of circumference of the foremost end of said cylindrical inserting member by wedge action or bringing said length of circumference back to said original length of circumference.

12. A flange for a hollow article according to claim 7, characterized in that a ring-like member is provided on the inside of a foremost end of said cylindrical inserting member, and between the foremost end of said cylindrical inserting member and said ring-like member there is provided a slit which extends from said cutout to a certain point in a circumferential direction.

13. A flange for a hollow article according to claim 9, characterized in that a ring-like member is provided on the inside of a foremost end of said cylindrical inserting member, and between the foremost end of said cylindrical inserting member and said ring-like member there is provided a slit which extends from said cutout to a certain point in a circumferential direction.

14. A flange for a hollow article detachably attached to an end of a pipe-like hollow article, characterized by comprising a disk having a concentric hole in a center thereof and a hollow cylindrical inserting member extending from said hole along a center axis thereof, wherein said hollow cylindrical inserting member comprises a cylindrical root contiguous to said disk and two semi-cylindrical expandable portions, each joined to said cylindrical root through three strut members, and expandable outwardly with respect to each other against resiliency with said center axis located therebetween, and between two positions between foremost ends of said semi-cylindrical expandable portions and with said center axis located therebetween, there are provided rocking or sliding segments that are engaged with side edges of the foremost ends of said semi-cylindrical expandable portions to space said semi-cylindrical expandable portions away from each other or to bring them back to original positions thereof, so that while said semi-cylindrical expandable portions are spaced away from each other, said flange for a hollow article is attached to the end of said hollow article, and while said semi-cylindrical expandable portions are brought back to said original positions, said flange for a hollow article is detached from the end of said hollow article.

15. A flange for a hollow article according to claim 14, characterized in that a center strut member located between said cylindrical root and one said semi-cylindrical expandable portions bears action of flexing said semi-cylindrical expandable portion resiliently with respect to said cylindrical root, and both side strut members located between said cylindrical rood and one said semi-cylindrical expandable portion bear action of preventing said semi-cylindrical expandable portions having said rocking or sliding segments from being displaced with respect to each other.

16. A flange for a hollow article according to claim 15, characterized in that a spacing between said side strut member joined to one of said semi-cylindrical expandable portions and said side strut joined to the other of said semi-cylindrical expandable portions becomes wide toward said disk.

17. A flange for a hollow article according to claim 14, characterized in that ring-like members are provided on the inside of the foremost ends of said semi-cylindrical expandable portions, and between said semi-cylindrical expandable portions and said ring-like members there are provided slits, each extending from a side edge of said semi-cylindrical expandable portion to a certain point in a circumferential direction.

18. A flange for a hollow article according to claim 15, characterized in that ring-like members are provided on the inside of the foremost ends of said semi-cylindrical expandable portions, and between said semi-cylindrical expandable portions and said ring-like members there are provided slits, each extending from a side edge of said semi-cylindrical expandable portion to a certain point in a circumferential direction.

19. A flange for a hollow article according to claim 7, characterized by being detachably attached to an end of a core paper tube of a roll of photosensitive material, around which photosensitive material is wound.

20. A flange for a hollow article according to claim 14, characterized by being detachably attached to an end of a core paper tube of a roll of photosensitive material, around which photosensitive material is wound.

* * * * *